United States Patent
Shah et al.

(10) Patent No.: US 7,068,183 B2
(45) Date of Patent: Jun. 27, 2006

(54) DRILL STRING INCORPORATING AN ACOUSTIC TELEMETRY SYSTEM EMPLOYING ONE OR MORE LOW FREQUENCY ACOUSTIC ATTENUATORS AND AN ASSOCIATED METHOD OF TRANSMITTING DATA

(75) Inventors: Vimal V. Shah, Sugar Land, TX (US); Eugene R. Linyaev, Houston, TX (US); Donald G. Kyle, The Colony, TX (US); Wallace R. Gardner, Houston, TX (US); Paul F. Rodney, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 32 days.

(21) Appl. No.: 10/882,730

(22) Filed: Jun. 30, 2004

(65) Prior Publication Data
US 2006/0001549 A1   Jan. 5, 2006

(51) Int. Cl.
*G01V 3/00*   (2006.01)

(52) U.S. Cl. .............................. 340/854.4; 340/853.3; 340/855.4; 340/855.5

(58) Field of Classification Search ............ 340/853.1, 340/853.3–853.4, 854.4–854.5, 855.4, 856.4; 367/81–83; 166/63, 65.1, 244.1, 281, 250.1, 166/297–298; 181/105–106, 117
See application file for complete search history.

(56) References Cited

U.S. PATENT DOCUMENTS

| | | | |
|---|---|---|---|
| 2,810,546 A | 10/1957 | Eaton et al. | |
| 3,191,143 A | 6/1965 | Pardue | |
| 3,265,091 A | 8/1966 | DeJarnett | |
| 3,588,804 A | 6/1971 | Fort | |
| 4,066,995 A | 1/1978 | Matthews | |
| 4,314,365 A | 2/1982 | Petersen et al. | |
| 4,320,473 A | 3/1982 | Smither et al. | |

(Continued)

FOREIGN PATENT DOCUMENTS

WO   WO96/21871 A1   7/1996

OTHER PUBLICATIONS

Chang, Dworak, Hsu, Lau, Masson, Mayes, McDaniel, Randall, Kostek, Plona "Sonic Compressional Measurements While Drilling"; SPWLA 35th Annual Logging Symp., Jun. 19-22, 1994.

*Primary Examiner*—Jeffery Hofsass
*Assistant Examiner*—Kimberly Jenkins
(74) *Attorney, Agent, or Firm*—Conley Rose, P.C.

(57) ABSTRACT

A drill pipe forms an acoustic transmission channel for data to be transmitted from a downhole transceiver to a surface transceiver. By positioning a first low frequency acoustic attenuator between a drill bit and the downhole transceiver, acoustic noise generated by the drill bit is attenuated. Similarly, by positioning the surface transceiver between the top of the drill pipe and a second low frequency acoustic attenuator, acoustic noise generated by surface equipment is attenuated. In this manner, the first and second low frequency acoustic attenuators serve as terminators for the acoustic transmission channel. Finally, by combining a third low frequency acoustic attenuator positioned between first and second sections of the drill pipe with first and second acoustic transceivers acoustically isolated from one another by the third low frequency acoustic attenuator and non-acoustically coupled to one another for bi-directional exchanges of signals, an acoustic repeater is provided for the transmission channel.

49 Claims, 3 Drawing Sheets

U.S. PATENT DOCUMENTS

| | | |
|---|---|---|
| 4,439,167 A | 3/1984 | Bishop et al. |
| 4,844,181 A | 7/1989 | Bassinger |
| 4,901,806 A | 2/1990 | Forrest |
| 5,510,582 A * | 4/1996 | Birchak et al. ............. 181/102 |
| 5,646,379 A | 7/1997 | Hsu et al. |
| 5,796,677 A | 8/1998 | Kostek et al. |
| 5,831,934 A | 11/1998 | Gill et al. |
| 5,926,437 A * | 7/1999 | Ortiz ........................... 367/35 |
| 6,615,949 B1 | 9/2003 | Egerev et al. |
| 2003/0052185 A1 | 3/2003 | Arian et al. |
| 2003/0179101 A1 | 9/2003 | Jenkins |

* cited by examiner

DRILL STRING INCORPORATING AN ACOUSTIC TELEMETRY SYSTEM EMPLOYING ONE OR MORE LOW FREQUENCY ACOUSTIC ATTENUATORS AND AN ASSOCIATED METHOD OF TRANSMITTING DATA

CROSS-REFERENCE TO RELATED APPLICATIONS

This application is related to co-pending U.S. patent application Ser. No. 10/882,915 entitled "A Low Frequency Acoustic Attenuator For Use In Downhole Operations", filed on even date herewith, assigned to the Assignee of the present application, and hereby incorporated by reference as if reproduced in its entirety.

STATEMENT REGARDING FEDERALLY SPONSORED RESEARCH OR DEVELOPMENT

Not applicable.

BACKGROUND

1. Technical Field

The present disclosure relates to a drill string for use in exploring subsurface earth formations. More particularly, the present disclosure relates to a drill string in which the transmission of data by an acoustic telemetry system associated with the drill string is enhanced by incorporating one or more low frequency acoustic attenuators into the drill string.

2. Description of Related Art

Geologists and geophysicists are often interested in the characteristics of subsurface earth formations encountered by a drill bit as it drills a well for the production of hydrocarbons from the earth. Such information is useful in determining the correctness of the geophysical data used to choose the drilling location and in choosing subsequent drilling locations. In horizontal drilling, such information can also be useful in determining the location of the drill bit and the direction that drilling should follow. It should be readily appreciated by those skilled in the art that the foregoing is but a rudimentary description of some of the ways in which information regarding the characteristics of a subsurface earth formation would be useful to geologists, geophysicists and/or others involved in the exploration of the subsurface earth formation. It is, however, a sufficiently detailed description for the purposes disclosed herein.

Information related to the characteristics of a subsurface earth formation can be derived in a number of ways. For example, cuttings from the mud returned from the drill bit location can be analyzed or a core can be bored along the entire length of the borehole. Alternatively, the drill bit can be withdrawn from the borehole and a wireline logging tool can be lowered into the borehole to take measurements. Other approaches, commonly referred to as either measurement-while-drilling (MWD) or logging-while-drilling (LWD) techniques, involve the use of tools which make measurements in the borehole while the drill bit is working. Of the aforementioned techniques, MWD and LWD are generally preferred because, by employing such techniques, information related to the subsurface earth formation may be acquired quicker and at lower cost. Currently, however, the bandwidth available for downhole telemetry systems, for example, mud pulse or electro-magnetic (EM) telemetry systems, is insufficient for transmitting essential MWD or LWD data in real time. As a result, data acquired by a MWD or LWD tool is often stored in a local memory in the tool and not retrieved from the local memory until after the tool has been removed from the borehole. As a result, data acquired by a MWD or LWD tool is not always available for analysis in real time.

The transmission of acoustic telemetry data through the drill pipe itself has been periodically contemplated. Acoustic telemetry systems which transmit data acoustically through a drill pipe have been able to transmit data at rates exceeding 50 bits-per-second (bps). A problematic issue related to the transmission of data acoustically through a drill pipe while drilling operations are being conducted is that on-going drilling operations tend to generate wide band bit noise which contaminates the acoustic channel through which data is being transferred. One source of such noise is the drill bit typically located at the end of the drill pipe. Another is the top drive or other mechanical equipment located at the surface and coupled to the drill pipe. Regardless of the source thereof, such noise tends to reduce the signal-to-noise (SNR) ratio within the acoustic transmission channel. As a result, the rate at which data may be transmitted through the acoustic transmission channel is reduced.

It should be appreciated, therefore, that devices capable of absorbing acoustical noise, drill strings which strategically employ one or more devices capable of absorbing acoustical noise and/or data transmission techniques which incorporate the use of devices which reduce the amount of noise entering the acoustic transmission channel of a drill pipe or other acoustical data transmission system would enhance LWD, MWD and other data acquisition techniques seeking to acquire downhole information and acoustically transmit the acquired information to the surface in real time.

BRIEF DESCRIPTION OF THE DRAWINGS

A better understanding of the present invention can be obtained when the detailed description is considered in conjunction with the following drawings, in which.

SUMMARY

Figure 1:
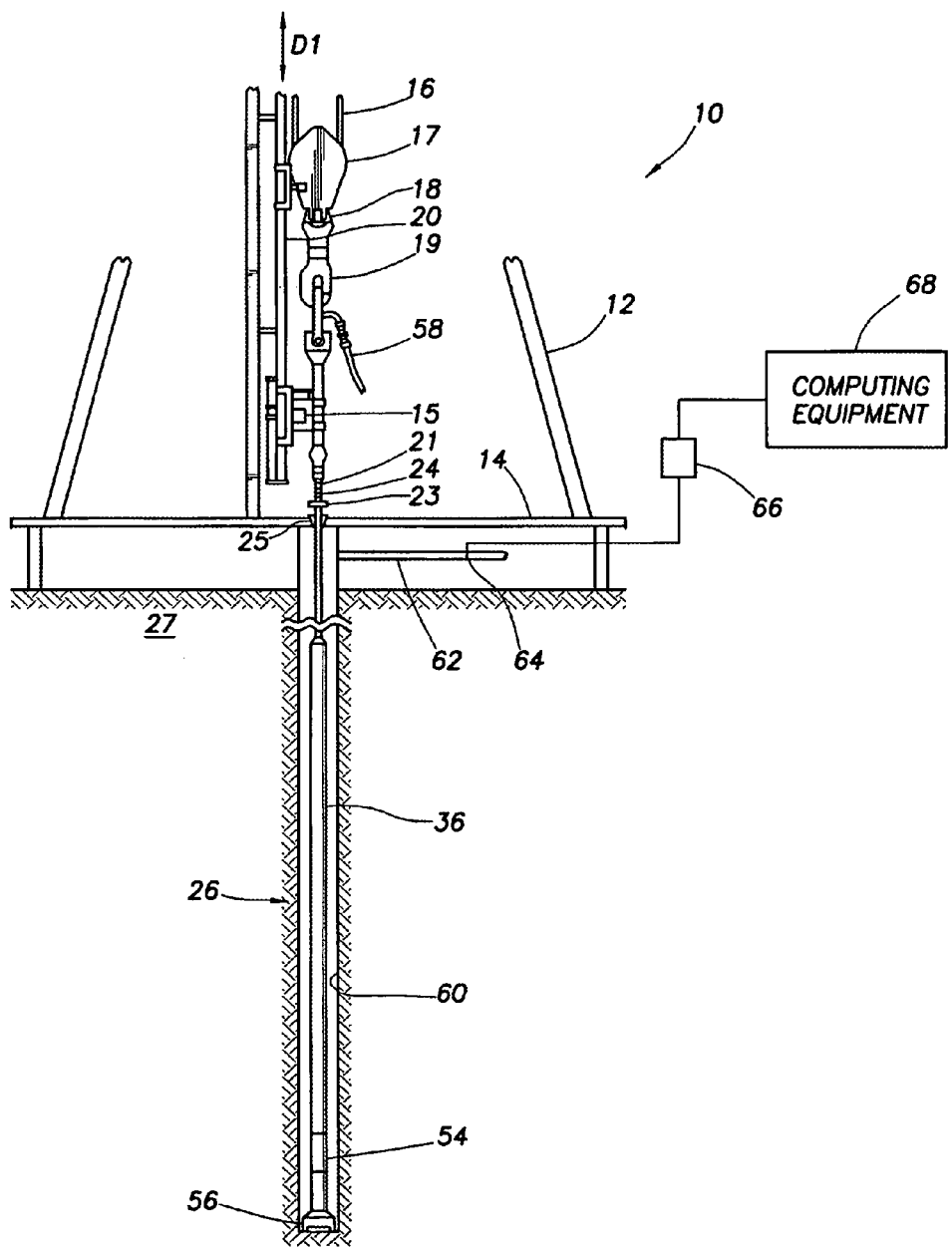
FIG. 1 illustrates a first drilling site where a representatively illustrated drill string, which incorporates a conventionally configured mud telemetry system, transmits downhole information to the surface in real time.

The present invention is directed to a drill string which includes a drill pipe to which a downhole data transceiver and a low frequency acoustic attenuator are coupled. Information acquired by the downhole data transceiver is acoustically transmitted via the drill pipe. In one aspect thereof, the drill string includes a drill bit and the low frequency acoustic attenuator is coupled between the drill bit and the data transceiver. In another, alternate, aspect thereof, the drill string includes a surface transceiver coupled to the drill pipe. In this aspect, the low frequency acoustic attenuator is coupled to the surface transceiver such that the surface transceiver is positioned between the drill pipe and the low frequency acoustic attenuator. In still another, alternate, aspect thereof, the drill pipe is comprised of first and second pipe sections. In this aspect, the low frequency acoustic attenuator is positioned between the first and second sections of drill pipe.

In various further aspects of this embodiment of the present invention, the drill string may have multiple low frequency acoustic attenuators. These further aspects of the invention may include various combinations of a low frequency acoustic attenuator coupled between the drill bit and the data transceiver, a low frequency acoustic attenuator coupled between the first and second sections of the drill pipe, and/or a low frequency acoustic attenuator coupled to the surface transceiver such that the surface transceiver is positioned between the drill pipe and the low frequency acoustic attenuator.

In accordance with the present invention, the drill pipe forms an acoustic transmission channel for uplink transmission of information from the downhole data transceiver to the surface transceiver and downlink transmission of acoustic control signals from the surface transceiver to the downhole data transceiver. By positioning a low frequency acoustic attenuator between the drill bit and the downhole data transceiver, acoustic noise generated by the drill bit is attenuated, thereby reducing the amount of drill bit noise entering the acoustic transmission channel. Similarly, by coupling a low frequency acoustic attenuator to the surface transceiver such that the surface transceiver is positioned between the drill pipe and the low frequency acoustic attenuator, acoustic noise generated by surface equipment is attenuated, thereby reducing the amount of surface equipment noise entering the acoustic transmission channel. In this manner, the aforementioned low frequency acoustic attenuators may serve as first and second acoustic terminators, respectively, for the acoustic transmission channel. Finally, by combining (1) a low frequency acoustic attenuator with a first acoustic transceiver positioned between the low frequency acoustic attenuator and a first section of the drill pipe, (2) a second acoustic transceiver positioned between the low frequency acoustic attenuator and a second section of the drill pipe and (3) a discrete coupling between the first acoustic transceiver and the second acoustic transceiver, the acoustic transmission channel is provided with an acoustic repeater capable of regenerating the data entering the acoustic transmission channel. Further, by placing one or more acoustic repeaters along the acoustic transmission channel, the data entering the acoustic transmission channel may be transferred greater distances.

Notation and Nomenclature

Certain terms are used throughout the following description and claims to refer to particular system components. This document does not intend to distinguish between components that differ in name but not in function.

In the detailed description and claims which follow, the terms "including" and "comprising" are used in an openended fashion, and thus should be interpreted to mean "including, but not limited to . . . ".

The term "couple" or "couples" is intended to mean either an indirect or direct electrical, mechanical or thermal connections. The term "couple" or "couples" is further intended to encompass both wireline connections and wireless connections. Thus, if a first device couples to a second device, that connection may be through a direct wireline connection, a direct wireless connection, an indirect wireline connection via other devices and/or connections or an indirect wireless connection via other devices and/or connections.

The terms "MWD systems" and "LWD systems" generally refer to those systems which provide wellbore directional surveys, petrophysical well logs, and drilling information in real time while drilling. They do so by employing instrumented drill collars and a downhole-to-surface data telemetry system.

The term "MWD" generally refers to measurements acquired downhole while drilling or specifically to describe directional surveying and drilling-related measurements.

The term "LWD" generally refers to petrophysical measurements, similar to open hole wireline logs, acquired while drilling.

The term "uplink" generally refers to the transmission of signals from a downhole data transceiver towards a surface data processing device.

The term "downlink" generally refers to the transmission of signals from a data processing device towards a downhole data transceiver.

DETAILED DESCRIPTION

It should be clearly understood that the present invention is susceptible to various modifications and alternative forms, specific embodiments of which are shown by way of example in the drawings and detailed description set forth herein. It should be clearly understood, however, that the drawings and detailed description set forth herein thereto are not intended to limit the invention to the particular form disclosed. On the contrary, the intention is to cover all modifications, equivalents and alternatives falling within the spirit and scope of the present invention as defined by the claims appended hereto.

Turning now to the figures, FIG. 1 illustrates a first drilling site where a representatively illustrated drill string incorporating a conventionally configured mud pulse telemetry system to transmit information regarding a first subsurface earth formation to the surface 27 in real time. As may now be seen, a drilling rig 10 includes a derrick 12, derrick floor 14, draw works 16, traveling block 17, hook 18, swivel 19, saver sub 21, slips 25 and a drill string 26 which, as shown in FIG. 1, is positioned in borehole 60. The drilling rig 10 is also equipped with a top drive 15, slidingly coupled to a torque track 20, to enable vertical movement of the top drive 15 along the axis D1. The drill string 26, which is supported by the slips 25 projecting upwardly from the derrick floor 14, is coupled to the top drive 15 through the saver sub 21. A drill pipe elevator 23 secured to elevator bales 24 extending from the top drive 15 moves the drill string 26 vertically with the top drive 15. In turn, the top drive 15 is raised or lowered by the traveling block 17. Thus, when the top drive 15 is raised or lowered, along the axis D1, by the traveling block 117, the drill string 26 is raised or lowered along the axis D1 as well.

As is common in the art, the drill string 26 is comprised of plural sections coupled to one another by an appropriate number of drill collars (not shown) or other conventional coupling structures. More specifically, the drill string 26 is comprised of a first section 36, a second section 54 and a third section 56. As will be more fully described below, the first section 36 of the drill string 26 is a section of drill pipe, the second section 54 of the drill string 26 is a downhole data transceiver, for example, a LWD tool, and the fourth section 56 of the drill string 26 is a drill bit. Drilling mud is injected into the swivel 19 by a drilling mud supply line 58. The drilling mud travels through the top drive 15, the saver sub 21, the drill pipe 36, the downhole data transceiver 54 and exits through ports (not shown) in the drill bit 56. The drilling mud then flows up the borehole 60. A drilling mud return line 62 returns drilling mud from the borehole 60 and circulates it to a drilling mud pit (not shown) and back to the drilling mud supply line 58. In a mud pulse telemetry system, the drilling mud is employed as an acoustic transmission channel. Thus, the drilling mud traveling through the borehole 60 transmits data containing downhole information, for example, data collected by the downhole data transceiver 54, to the surface 27 for analysis. To do so, the downhole data transceiver 54 collects data and modulates the collected data onto a carrier capable of being transmitted through the drilling mud. An acoustic sensor 64 positioned, on the surface 27, along the drilling mud return line 62 detects the data being transmitted uplink in the drilling mud and forwards the detected data to a demodulator 66. The demodulator 66 first demodulates the received data and subsequently transmits it to computing equipment 68. There, the received data would be analyzed to extract the downhole information.

While a mud pulse telemetry system which employs the drilling mud as the acoustic transmission channel for acquired data is capable of transmitting data acquired by the downhole data transceiver 54 to the surface in real time, limitations on the suitability of the drilling mud as the acoustic transmission channel have prevented much of the data acquired by the downhole data transceiver 54 from being transmitted to the computing equipment 68 in real-time. More specifically, in current implementations of mud pulse telemetry systems, real-time transmission of information acquired by the downhole data transceiver 54 is limited to selected parameters, typically those deemed "vital" to certain real-time applications and decisions. Conversely, the remaining types of raw data, for example, diagnostic parameters and other types of information deemed "less vital" is recorded in downhole memory and accessed at the end of each bit run.

Figure 2:
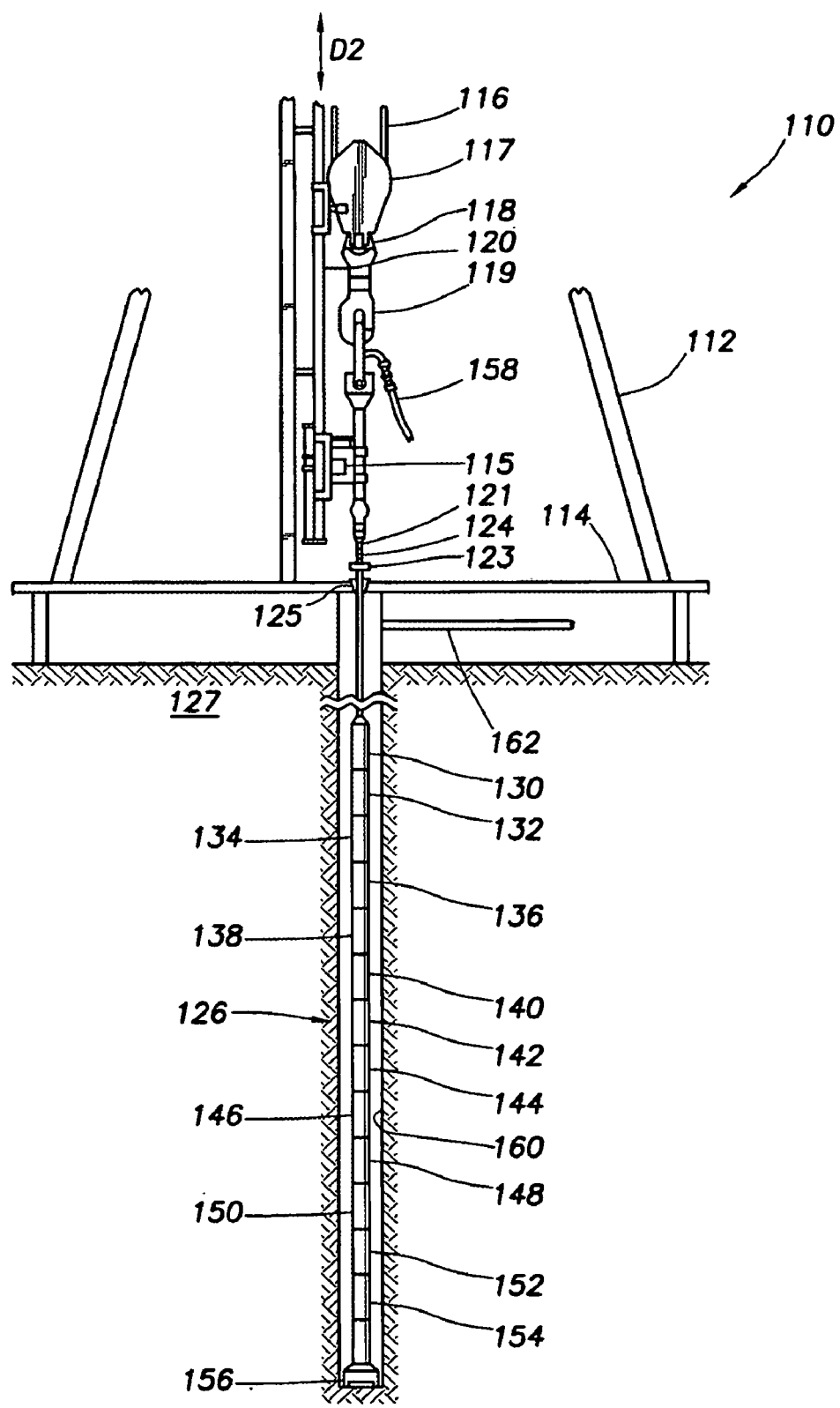
FIG. 2 illustrates a second drilling site where a representatively illustrated drill string, which incorporates an acoustic telemetry system constructed in accordance with the teachings of the present invention and employing one or more low frequency acoustic attenuators, transmits downhole information to the surface in real time.

To overcome the deficiencies of prior drill strings and the aforementioned limitations on real time transmission of data associated with mud pulse and other prior telemetry systems, in FIG. 2, a second drill site where a representatively illustrated drill string incorporating an acoustic telemetry system, constructed in accordance with the teachings of the present invention and employing one or more low frequency acoustic attenuators, to transmit downhole information in real time may now be seen. Of course, it should be clearly understood that, in FIG. 2, the drill string 126 has been greatly simplified for ease of illustration and numerous details related to the drill string 126 not needed for a complete understanding of the principles of the present invention have been omitted for ease of description. For example, as previously noted, the drilling collars which secure the various sections of the drill string 126 to one another have been omitted. Further, devices that are oftentimes incorporated into drilling collars, for example, downhole data transceivers, appear as discrete sections of the drill string 126. Still further, the drill string 126 would typically include a combination of longer, shorter, more numerous and/or fewer sections of drill pipe than the fourteen sections of equal length described and illustrated herein. Finally, while the drill string 126 is shown to include only a single downhole data transceiver, drill strings typically include any number and/or variety of downhole data transceivers or other types of downhole tools As may now be seen, a drilling rig 110 includes a derrick 112, derrick floor 114, draw works 116, traveling block 117, hook 118, swivel 119, saver sub 211, slips 125 and a drill string 126 which, as shown in FIG. 2, is positioned in borehole 160. The drilling rig 110 is also equipped with a top drive 115, slidingly coupled to a torque track 120, to enable vertical movement of the top drive 115 along axis D2. The drill string 126, which is supported by slips 125 projecting upwardly from the derrick floor 114, is coupled to the top drive 115 through the saver sub 121. A drill pipe elevator 123 secured to elevator bales 124 extending from the top drive 115 moves the drill string 126 vertically with the top drive 115. Thus, when the top drive 115 is raised or lowered by the traveling block 117 along the axis D2, the drill string 26 is raised or lowered along the axis D2 as well.

Figure 3:
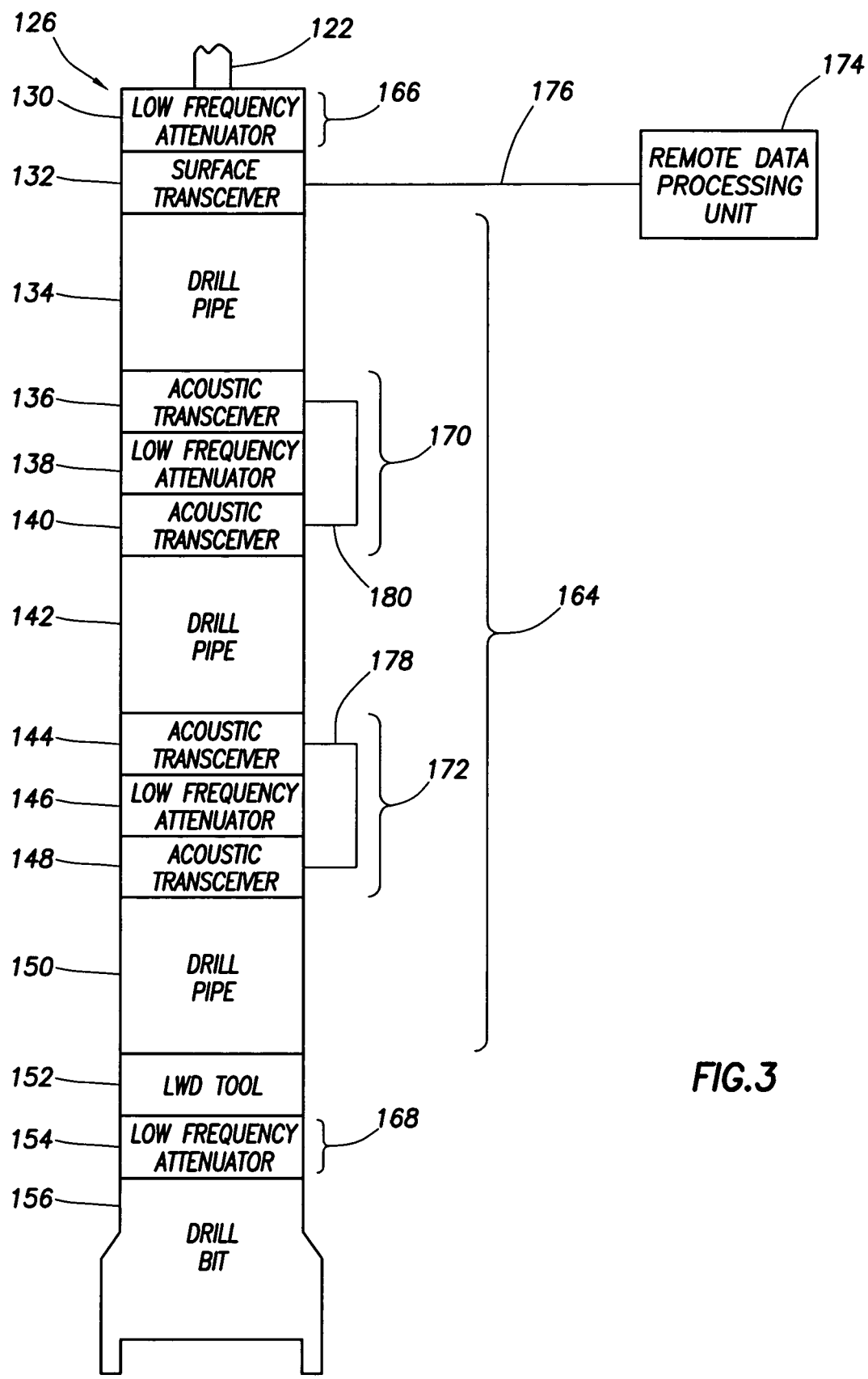
FIG. 3 is an expanded view of the representatively illustrated drill string of FIG. 2.

The drill string 126 is comprised of plural sections coupled to one another by an appropriate number of drill collars (not shown) or other conventional coupling structures. As previously indicated, the drill string 126 is representatively illustrated in FIGS. 2 and 3. Accordingly, as it appears in FIGS. 2 and 3, the drill string 126 has been greatly simplified. As a result, the physical appearance of the sections of the drill string 126 may vary dramatically from that shown in FIGS. 2 and 3. Furthermore, the actual lengths of the various sections of the drill string 126 do not necessarily bear any relationship to the lengths of such sections as they appear in FIGS. 2 and 3. For example, while a first section of the drill string 126 may have an actual length which is several times greater than the actual length of a second section of the drill string 126, in FIGS. 2 and 3, the first and second sections of the drill string 126 may appear (or not appear) to be of equal length. Finally, as illustrated in FIGS. 2 and 3, the number and length of the sections of the drill string 126 are purely arbitrary. Accordingly, a physical implementation of the drill string 126 may include any number and type of sections, including types of sections not specifically disclosed herein.

For example, in the embodiment shown in FIG. 2, the drill string 126 is comprised of a first section 130, a second section 132, a third section 134, a fourth section 136, a fifth section 138, a sixth section 140, a seventh section 142, an eighth section 144, a ninth section 146, a tenth section 148, an eleventh section 150, a twelfth section 152, a thirteenth section 154 and a fourteenth section 156. As will be more full described below, in this embodiment, the first section 130 of the drill string 126 is a first low frequency acoustic attenuator, the second section 132 of the drill string 126 is a surface transceiver, the third section 134 of the drill string 126 is a first section of drill pipe, the fourth section 136 of the drill string 126 is a first acoustic transceiver, the fifth section 138 of the drill string 126 is a second low frequency acoustic attenuator, the sixth section 140 of the drill string 126 is a second acoustic transceiver, the seventh section 142 of the drill string 126 is a second section of drill pipe, the eighth section 144 of the drill string 126 is a third acoustic transceiver, the ninth section 146 of the drill string 126 is a third low frequency acoustic attenuator, the tenth section 148 of the drill string 126 is a fourth acoustic transceiver, the eleventh section 150 of the drill string 126 is a third section of drill pipe, the twelfth section 152 of the drill string 126 is a third acoustic transceiver, the thirteenth section 152 of the drill string 152 is a downhole transceiver, for example, an LWD tool, the fourteenth section 154 of the drill string 126 is a fourth low frequency acoustic attenuator and the fourteenth section 156 of the drill string 126 is a drill bit.

Drilling mud is injected into the swivel 119 by a drilling mud supply line 158. The drilling mud travels through the top drive 115, the saver sub 121, the first through fourteenth sections 130 through 154 of the drill string 126 and exits through ports (not shown) in the drill bit 156. The drilling mud then flows up through the borehole 160. A drilling mud return line 162 returns drilling mud from the borehole 160 and circulates it to a drilling mud pit (not shown) and back to the drilling mud supply line 158. Unlike the drill string 26, however, the drill string 126 does not utilize a mud pulse telemetry system to transmit data collected by the downhole data transceiver 154 to the surface. Rather, data acquired by the downhole data transceiver 154, for example, LWD acoustic telemetry (LAT) data is transferred uplink to the surface 127 using an acoustic telemetry system implemented by the downhole data transceiver 154, the surface transceiver 132 and an acoustic transmission channel 164 extending, as shown in FIG. 3, from the downhole data transceiver 154 to the surface transceiver 132. The acoustic transmission channel 164 is implemented, in the disclosed downhole environment, using sections of the drill pipe of the drill string 126, for example, the first drill pipe section 134, the second drill pipe section 142 and the third drill pipe section 150.

Focusing now on FIG. 3, the aforementioned acoustic transmission channel 164, as well as plural low frequency acoustic attenuators 130, 138, 146 and 154 used in conjunction with the acoustic transmission channel 164 shall now be described in greater detail. It should first be noted, however, that the low frequency acoustic attenuators 130, 138, 146 and 154 described and illustrated herein are configured for attenuating compressional waves. It is fully contemplated, however, that the low frequency acoustic attenuators 130, 138, 146 and 154 would also attenuate lateral vibrations or torsional vibrations that had undergone full or partial mode conversion into compressional waves. It is further contemplated that the acoustic transmission channel 164 could also be equipped with one or more additional low frequency acoustic attenuators configured to attenuate torsional, rather than compressional, vibrations. Variously, such low frequency torsional acoustic attenuators may be used exclusive of, or in conjunction with, the low frequency compressional acoustic attenuators described and illustrated herein. Such an alternate configuration would be particularly useful in conjunction with a torsional wave telemetry system.

on opposite ends thereof, the acoustic transmission channel 164 is bounded by a first (or "upper") terminator 166 and a second (or "lower") terminator 168, respectively. As will be more fully described below, the upper and lower terminators 166 and 168 act to prevent external noise originating from those portions of the drill string 126 located above and below the acoustic transmission channel 164, respectively, from entering the acoustic transmission channel 164 where the external noise would interfere with the uplink transmission of the LAT data from the downhole data transceiver 152 to the surface transceiver 129 via the acoustic transmission channel 164. The upper terminator 166 is implemented, in the downhole environment, by coupling a low frequency acoustic attenuator, preferably, a low frequency acoustic attenuator configured to attenuate acoustical noise in the range of about 400 Hz to about 2 kHz, in an upper portion of the drill string 126, preferably, between the surface transceiver 132 and the top drive 115 (or other mechanized system) responsible for vertical movement of the drill string 126. A low frequency acoustic attenuator suitable for implementation as the upper terminator 166 of the acoustic transmission channel 164 is disclosed in co-pending U.S. patent application Ser. No. 10/882,915, entitled "A Low Frequency Acoustic Attenuator For Use In Downhole Operations" and previously incorporated by reference as if reproduced in its entirety. Similarly, the lower terminator 168 is implemented, in the downhole environment, by coupling a low frequency acoustic attenuator, preferably, a low frequency acoustic attenuator configured to attenuate acoustical noise in the range of about 400 Hz to about 2 kHz, in a lower portion of the drill string 126, preferably, between the downhole data transceiver 152 and the drill bit 156. Again, a low frequency acoustic attenuator suitable for implementation as the lower terminator 168 of the acoustic transmission channel 164 is disclosed in co-pending U.S. patent application Ser. No. 10/882,915, entitled "A Low Frequency Acoustic Attenuator For Use In Downhole Environments" and previously incorporated by reference as if reproduced in its entirety.

Before proceeding to FIG. 3, a second, preferred, configuration of the drill string 126 will now be described. As previously set forth, the drill string 126 was configured to include a first section 130' comprised of a first low frequency acoustic attenuator configured to attenuate acoustical noise in the range of about 400 Hz to about 2 kHz. As was also previously set forth, the first low frequency acoustic attenuator 130' was positioned such that it bounded the acoustic transmission channel 164 and served as the upper terminator 166' for the acoustic transmission channel 164. As the upper terminator 166' for the acoustic transmission channel 164, the first low frequency acoustic attenuator 130' prevented external noise originating from those portions of the drill string 126 located above the acoustic transmission channel 164 from entering the acoustic transmission channel 164. Furthermore, by positioning the first low frequency attenuator 130' between the surface transceiver 132 and the top drive 115 or other surface equipment responsible for vertical movement of the drill string 126, acoustical noise generated by the top drive 115 was attenuated before the noise entered the acoustic transmission channel 164 and contaminated the uplink acoustic data or downlink control data.

To more effectively attenuate acoustical noise generated by the top drive 115, it is further contemplated that, in this second, preferred, configuration of the drill string 126, in place of the low frequency acoustic attenuator 130', the drill string 126 is instead configured to include low frequency acoustic attenuator 130". Unlike the low frequency acoustic attenuator 130', the low frequency acoustic attenuator 130" is positioned, along the drill string 126, immediately below the top drive 115 or other source of surface noise. In this embodiment, the low frequency acoustic attenuator 130" will still serve as upper terminator 166" for the acoustic transmission channel 164. However, because of its proximity to the source of the surface noise, specifically, the top drive 115, which may potentially contaminate the acoustic transmission channel 164, it is contemplated that the low frequency acoustic attenuator 130" will more effectively attenuate surface noise. It is further contemplated that, by positioning the low frequency acoustic attenuator 130" immediately below the top drive 115, the exchange of signals between the surface transceiver 132 and the remote data processing unit 174 will be simplified in that the communication path will no longer need to circumvent the low frequency acoustic attenuator 130'.

Further details of the drill string 126 will now be described, again with respect to FIG. 3. Like FIG. 2, FIG. 3 is a representative illustration of the sections 130 through 156 of the drill string 126. As previously noted, the drill string 126 includes first, second, third and fourth low frequency acoustic attenuators 130, 138, 146 and 154, surface transceiver 132, first, second, third and fourth acoustic transceivers 136, 140, 144 and 148, first, second and third drill pipe sections 134, 142 and 150, the downhole data transceiver 152 and the drill bit 156. As will be more fully described below, each of the first, second, third and fourth low frequency acoustic attenuators 128, 136, 144 and 154 enhances the transmission of data through the first, second and third drill pipe sections 134, 142 and 150 of the drill string 126. As previously set fourth, a shortcoming of acoustic telemetry systems results from the propagation of noise into the acoustic transmission channel 164 thereof, here, that portion of the drill string 126 located between the downhole data transceiver 152 and the surface transceiver 132.

The first and fourth low frequency acoustic attenuators 130 and 154 prevents external noise from entering the acoustic transmission channel 164; the first low frequency attenuator 130 serving as an upper acoustic barrier for the acoustic transmission channel 164 and the fourth low frequency acoustic attenuator 154 serving as a lower acoustic barrier for the acoustic transmission channel 164. More specifically, by coupling the downhole data transceiver 152 to the drill bit 156 such that the fourth low frequency acoustic attenuator 154 is positioned between the drill bit 156 and the downhole data transceiver 152, acoustical noise generated by the drill bit 156 is attenuated as it propagates through the fourth low frequency acoustic attenuator 154, thereby reducing contamination of the acoustic transmission channel 164 by drill bit noise. In turn, the SNR within the acoustic transmission channel 164 is increased, the telemetry rate for the acoustic transmission channel 164 is improved and the overall robustness of the acoustic transmission channel 164 is enhanced.

In addition to preventing drill bit noise from entering the acoustic transmission channel 164, it should be further noted that by positioning the fourth low frequency acoustic attenuator 154 beneath the downhole data transceiver 152, significant benefits are provided in non-drilling environments. More specifically, when positioned in this manner in non-drilling environments, the fourth low frequency acoustic attenuator 154 will attenuate undesired reflections of downwardly propagating components of uplink data from reflecting off of the bottom of the drill string 126 and back into the acoustic transmission channel 164 where they could potentially interfere with subsequently transmitted uplink data. By positioning the fourth low frequency acoustic attenuator 154 in this manner, it should be further noted that the fourth low frequency acoustic attenuator 154 will also prevent downlink control data from reflecting off of the bottom of the drill string 129 and back up the acoustic transmission channel 164 where it could potentially contaminate subsequently transmitted commands. Of course, while either of the foregoing situations is, in theory, also possible in drilling environments, it is noted that, in drilling environments, the noise generated by the drill bit 156 tends to mask any such reflections of uplink data signals or downlink control signals being respectively reflected off the bottom of the drill string 126.

Similarly, by coupling the first low frequency attenuator 130 to the surface transceiver 132 such that the first low frequency attenuator 130 is positioned between the surface transceiver 132 and the top drive 115 or other surface equipment responsible for vertical movement of the drill string 126, acoustical noise generated by the top drive 115 would be attenuated before the noise enters the acoustic transmission channel 164 and contaminates the uplink acoustic data or downlink control data. The first low frequency acoustic attenuator would also prevent uplink data from reflecting off the top of the drill string 126 and returning downlink where the reflected data could interfere with subsequently transmitted bits of data.

In addition, FIG. 3 shows plural low frequency acoustic attenuators, preferably, low frequency acoustic attenuators respectively configured to attenuate acoustical noise in the range of about 400 Hz to about 2 kHz, more specifically, the second and third low frequency acoustic attenuators 138 and 146 being coupled at intermediate locations along the drill string 126. As will be more fully described below, each of these low frequency acoustic attenuators 138 and 146 serve as part of acoustic repeaters 170 and 172, respectively, of the acoustic transmission channel 164. More specifically, the acoustic repeater 170 is comprised of the low frequency acoustic attenuator 138 sandwiched between the first acoustic transceiver 136 and the second acoustic transceiver 140 while the acoustic repeater 172 is comprised of the low frequency acoustic attenuator 146 sandwiched between the third acoustic transceiver 144 and the fourth acoustic transceiver 148. In the disclosed configuration, the low frequency acoustic attenuator servers to acoustically isolate the corresponding pair of transceivers from one another by a low frequency acoustic attenuator while a bi-directional non-acoustic coupling enables the exchange of signals between the transceivers. As before, a low frequency acoustic attenuator suitable for implementation as part of the acoustic repeaters 170 and 172 of the acoustic transmission channel 164 is disclosed in co-pending U.S. patent application Ser. No. 10/882,915, entitled "A Low Frequency Acoustic Attenuator For Use In Downhole Operations" and previously incorporated by reference as if reproduced in its entirety. Of course, while FIG. 3 shows the drill string 126 as including two such acoustic repeaters, specifically, the acoustic repeaters 170 and 172, it should be clearly understood that the number of acoustic repeaters included within a drill string will vary on a number of factors such as the length of the acoustic transmission channel over which data is to be transmitted and the rate of signal loss for the acoustic transmission channel. Further, as disclosed herein, each low frequency acoustic attenuator forming part of an acoustic repeater is sandwiched between first and second acoustic transceivers electrically coupled to one another for the bi-directional exchange of electrical signals therebetween. It is fully contemplated, however, that the first and second transceivers of an acoustic repeater may instead be coupled by a wide variety of suitable non-acoustical couplings, for example, an EM coupling, a microwave communication coupling, a high frequency coupling or other suitable technique for coupling the first and second transceivers for the bi-directional exchange of signals therebetween. For example, a long section of drill pipe characterized by sufficiently high acoustic signal loss would also suitable for use when acoustically separating the transceivers.

The acoustic repeaters 170 and 172 serve to enable data to acoustically propagate along a greater length of drill pipe than would ordinarily be possible without employing the acoustic repeaters as part of the drill string 126. For example, in a typical operation, the downhole data transceiver 152 acquires downhole information and converts it into acoustical data for propagation along the acoustic transmission channel 164. Signal loss which normally occurs over a section of drill pipe, for example, the drill pipe section 150, may prevent the data from reaching the surface transceiver 132 where it would be converted into electrical signals and transmitted, by the surface transceiver 132, to remote data processing unit 174. Depending on various factors, for example, the length of the drill string 126, the data may need to be periodically regenerated as it is transmitted uplink along the acoustic transmission channel 164 to ensure that the uplink data reaches the surface transceiver 132. For example, rather than being dissipated by signal loss while propagating uplink along drill pipe section 150, upon being detected by the acoustic transceiver 148, the acoustic transceiver 148 converts the detected data signal into a non-acoustic signal, here, for example, an electrical data signal. The acoustic transceiver 148 then transmits the data to the acoustically isolated (relative to the acoustic transceiver 148) acoustic transceiver 144 over electrical link 178. There, the electrical data signal is reconverted into a data signal and again acoustically propagated uplink, here, along the drill pipe section 142 of the acoustic transmission channel 164, until being detected by the next acoustic transceiver, here, the acoustic transceiver 140.

Significant benefits are achieved by the use of low frequency acoustic attenuators as part of acoustic repeaters. In the past, acoustic repeaters have been configured such that the transmitter and receiver devices are located in close proximity to one another. As a result, when the transmitter of an acoustic repeater is actuated to regenerate an acoustic signal, the receiver associated with the acoustic repeater receives the regenerated acoustic signals at a significant amplitude, thereby resulting in the saturation of the receiver electronics due to the proximity of the receiver to the transmitter and the amplitude of the regenerated signal received by the receiver. Because of this, the receiver would be unable to monitor acoustic signals from a second, more distant, transmitter and successfully decode such information. As a result, conventional acoustic data transmission systems require the receiver to completely receive the acoustic signals from the second, more distant transmitter, decode the information contained in the signals and store the information before associated transmitter can actuate and send the amplified signal further. Thus, by positioning low frequency attenuators between successive transceivers of an acoustic repeater, saturation of the receiver section of the acoustic repeater is avoided. By avoiding saturation conditions, it is possible to conduct half duplex operations which double the telemetry data rates through the acoustic transmission channel 164. Furthermore, the low frequency acoustic attenuators serve to prevent leakage of acoustic signals between successive sections of the acoustic transmission channel 164, for example, if acoustic signals generated by the acoustic transceiver 148 entered the drill pipe section 142, or the reflection of acoustic signals back into a section of the acoustic transmission channel 164, for example, if the acoustic signals generated by the acoustic transceiver 144 and detected by the. acoustic transceiver 140 was, in addition to being regenerated into the drill pipe section 142, reflected, by the acoustic transceiver 144, into the drill pipe section 150.

Thusfar, the term "transceiver" has been used in conjunction with various sections of the drill string 126, for example, the surface transceiver 132 and the acoustic transceivers 136, 140, 144 and 148. As is commonly known in the art, a transceiver is capable of both transmitting and receiving signals. Thus, when the terms "transmitting" and "receiving" are use, it should be clearly understood that the foregoing terms may indicate either the transmitting or receiving functionality within a transceiver or the direction of data and/or control signals relative to the drill string 126. In other words, the acoustic transceivers 144 and 136 serve as acoustic transmitters during uplink transmissions of acoustic data but further serve as acoustic receivers during downlink transmissions of acoustic control signals. Similarly, the acoustic transceivers 148 and 140 serve as acoustic receivers during uplink transmissions of acoustic data but serve as acoustic transmitters during downlink transmissions of acoustic control signals while the surface transceiver 132 serves as a transmitter during uplink transmissions of data signals and as a receiver during downlink transmissions of control signals.

In closing, the uplink transmission of data signals and the downlink transmission of control signals will now be described briefly. The downhole transceiver 152 acquires downhole data and acoustically transmits the acquired data uplink along the acoustic transmission channel 164. The data signal passes through the drill pipe section 150 acoustically and is detected by the acoustic transceiver 148. As the data signal has begun to experience loss traversing the drill pipe section 1450 the acoustic transceiver 148 commences a first regeneration of the original data signal. To do so, the acoustic transceiver 148 converts the detected acoustic data signal into an electrical data signal and passes it, via the electrical link 172, to the acoustic transceiver 144 where the original data signal is regenerated therefrom. The regenerated acoustic data signal continues to propagate acoustically along the acoustic transmission channel 164, specifically, the drill pipe section 142, again, experiencing loss, until detected by the acoustic transceiver 140 where a second regeneration of the original data signal is commenced. Here, the acoustic transceiver 140 converts the detected data signal to an electrical data signal and passes it, via the electrical link 180, to the acoustic transceiver 136, where the original data signal is again regenerated therefrom.

The regenerated data signal continues acoustic propagation along the acoustic transmission channel 164, specifically, the drill pipe section 134, until being detected by the surface transceiver 132. The surface transceiver 132 is responsible for converting the acoustically propagated data signal into an electrical data signal and transmitting the converted data signals to their final destination, here, remote data processing unit 174 on the surface. It is contemplated that the surface transceiver 132 may include various types of conventionally configured telemetry equipment. For example, the surface transceiver 132 may include a wireless transmitter/receiver system for exchanging signals with the remote data processing unit 174. In this configuration, link 176 would be a wireless link 176. Alternately, the surface transceiver 132 may include a wireline transmitter/receiver system and a swivel, in which case, the link 176 would be a wireline link. For example, a wireline transmitter/receiver system suitable for the purposes contemplated herein is disclosed in U.S. Pat. No. 4,314,365 to Petersen et al. Regardless of the specific configuration thereof, once the surface transceiver 132 has forwarded the data to the remote data processing unit 174 located on the surface, the remote data processing unit 174, for example, a personal computer ("PC") or other computing system, analyzes the received data signals related to the downhole information acquired by the downhole data transceiver 152. Alternately, of course, the remote data processing unit 174 may simply be a data recorder which stores data for subsequent processing by a second remote data processing unit (not shown), typically, one at a location remotely located relative to the drill site 110.

It is also contemplated that the remote data processing unit 174 may be further configured to issue commands to the various devices attached to the drill strong 126 such as the downhole data transceiver 152, for example, to initiate, terminate or modify various parameters related to data collection. Commands issued by an operator of the remote data processing unit 174, for example, via a user interface (not shown) thereof, are transmitted to the surface transceiver 132 via the link 176. In turn, the surface transceiver 132 acoustically transmits the received command downlink through the drill pipe section 134. The acoustically transmitted command is received by the acoustic transceiver 136 which converts it into an electrical signal for transmission to the acoustic transceiver 140 via the link 180. From the received electrical signal, the acoustic transceiver 140 regenerates the command for further acoustic propagation downlink through the drill pipe section 142 of the acoustic transmission channel 164. The regenerated acoustic command is subsequently detected by the acoustic transceiver 144 which, in a manner similar to the acoustic transceiver 136, converts the received acoustic command into an electrical signal for transmission to the acoustic transceiver 148 via the link 178. In turn, the acoustic receiver 148 regenerates the original downlink command from the received electrical signal and acoustically transmits the regenerated command through the drill pipe section 150 of the acoustic data transmission channel 164. Subsequently, the regenerated downlink acoustic command is detected by the downhole data transceiver 152, which executes the received command.

Thus, there has been described and illustrated herein, a drill string for use in exploring subsurface earth formations in which the transmission of data and/or commands is enhanced by incorporating, into the drill string, an acoustic telemetry system employing one or more low frequency acoustic attenuators, thereby advantageously affecting the transmission rate of data and/or commands along an acoustic data transmission channel defined by the drill string. It should be clearly understood, however, that numerous variations and modifications of the techniques disclosed herein will become apparent to those skilled in the art once the above disclosure is fully appreciated. Accordingly, it is fully intended that the following claims be interpreted to embrace all such variations and modifications.

What is claimed is:

1. A drill string for transmitting data, comprising:
a drill pipe capable of acoustically transmitting data;
a downhole data transceiver coupled to said drill pipe, said downhole transceiver configured to acquired downhole information and transmit said acquired downhole information to said drill pipe as data; and
a first low frequency acoustic attenuator coupled to said drill pipe,
wherein said drill pipe has first and second ends, said downhole data transceiver has first and second ends, said second end of said downhole data transceiver coupled to said first end of said drill pipe,
wherein said first low frequency acoustic attenuator is coupled to said first end of said downhole data transceiver, and
wherein said drill pipe functions as an acoustic transmission channel and said low frequency acoustic attenuator functions as a terminator for said acoustic transmission channel.

2. A drill string for transmitting data, comprising:
a drill pipe capable of acoustically transmitting data;
a downhole data transceiver coupled to said drill pipe, said downhole transceiver configured to acquire downhole information and transmit said acquired downhole information to said drill pipe as data;
a first low frequency acoustic attenuator coupled to said drill pipe,
wherein said drill pipe has first and second ends, said downhole data transceiver has first and second ends, said second end of said downhole data transceiver coupled to said first end of said drill pipe,
wherein said first low frequency acoustic attenuator is coupled to said first end of said downhole data transceiver, and
wherein said low frequency acoustic attenuator has first and second ends, said second end of said low frequency acoustic attenuator is coupled to said first end of said downhole transceiver,
a surface transceiver coupled to said second end of said drill pipe, said surface transceiver configured to transmit data, received from said downhole transceiver via said drill pipe, to a surface device; and
a second low frequency acoustic attenuator;
said drill pipe further comprising:
a first pipe section having first and second ends; and
a second pipe section having first and second ends;
said first end of said first pipe section coupled to said first low frequency attenuator and said second end of said first pipe section coupled to said second low frequency acoustic attenuator; and
said first end of said second pipe section coupled to said second low frequency acoustic attenuator and said second end of said second pipe section coupled to said surface transceiver.

3. The drill string of claim 2, and further comprising:
a first transceiver coupled between said second end of said first pipe section and said second low frequency acoustic attenuator; and
a second transceiver between said first end of said second pipe section and said second low frequency acoustic attenuator;
said second low frequency acoustic affenuator acoustically isolating said second transceiver from said first transceiver;
said first transceiver non-acoustically coupled to said second acoustic transceiver;
said first transceiver non-acoustically transmitting data received thereby to said second transceiver; and
said second transceiver regenerating said data received by said first acoustic transceiver.

4. The drill string of claim 3, wherein said first and second low frequency acoustic attenuators are each configured to attenuate acoustical noise in the range of about 400 Hz to about 2 kHz.

5. A drill string for transmitting data, comprising:
a drill pipe capable of acoustically transmitting data;
a downhole data transceiver coupled to said drill pipe, said downhole transceiver configured to acquire downhole information and transmit said acquired downhole information to said drill pipe as data; and
a first low frequency acoustic attenuator coupled to said drill pipe,
wherein said drill pipe has first and second ends, said downhole data transceiver has first and second ends, said second end of said downhole data transceiver coupled to said first end of said drill pipe,
wherein said first low frequency acoustic attenuator is coupled to said second end of said drill pipe, and
wherein said drill pipe functions as an acoustic transmission channel and said first low frequency attenuator functions as a surface noise isolator for said acoustic transmission channel.

6. The drill string of claim 5, wherein said first low frequency acoustic attenuator is configured to attenuate acoustical noise in the range of about 400 Hz to about 2 kHz.

7. The drill string of claim 5, and further comprising a surface transceiver coupled between said second end of said drill pipe and said first low frequency acoustic attenuator, said surface transceiver configured to transmit data, received from said downhole data transceiver via said drill pipe, to a surface device.

8. The drill string of claim 7, and further comprising:
a second low frequency acoustic attenuator;
said drill pipe further comprising:
a first pipe section having first and second ends; and
a second pipe section having first and second ends;
said first end of said first pipe section coupled to said downhole transducer and said second end of said first pipe section coupled to said second low frequency acoustic attenuator; and
said first end of said second pipe section coupled to said second low frequency acoustic attenuator and said second end of said second pipe section coupled to said surface transducer.

9. The drill string of claim 8, and further comprising:
a first transceiver coupled between said second end of said first pipe section and said second low frequency acoustic attenuator; and
a second transceiver coupled between said first end of said second pipe section and said second low frequency acoustic attenuator;
said second low frequency acoustic attenuator acoustically isolating said second transceiver from said first transceiver;
said first transceiver non-acoustically coupled to said second acoustic transceiver;
said first transceiver non-acoustically transmitting data received thereby to said second transceiver; and
said second transceiver regenerating said data received by said first acoustic transceiver.

10. The drill string of claim 9, wherein said first and second low frequency acoustic attenuators are each configured to attenuate acoustical noise in the range of about 400 Hz to about 2 kHz.

11. A drill string for transmitting data, comprising:
a drill pipe capable of acoustically transmitting data;
a downhole data transceiver coupled to said drill pipe, said downhole transceiver configured to acciuire downhole information and transmit said acquired downhole information to said drill pipe as data;
a first low frequency acoustic attenuator coupled to said drill pipe;
a drill bit coupled to said first end of said downhole transceiver; and
a second low frequency acoustic attenuator; wherein
said first low frequency acoustic attenuator is coupled between said drill bit and said first end of said downhole data transceiver and said second low frequency acoustic attenuator is coupled to said second end of said drill pipe.

12. The drill string of claim 11, wherein said drill string has first and second ends, said drill bit comprising said first end of said drill string and said second low frequency acoustic attenuator comprising said second end of said drill string.

13. The drill string of claim 12, wherein said drill pipe forms an acoustic transmission channel for data, said first low frequency acoustic attenuator forms a first acoustic terminator for said acoustic transmission channel and said second low frequency acoustic attenuator forms a surface noise isolator for said acoustic transmission channel.

14. The drill string of claim 13, wherein said first and second low frequency acoustic attenuators are each configured to attenuate acoustical noise in the range of about 400 Hz to about 2 kHz.

15. The drill string of claim 13, and further comprising:
a surface transceiver coupled between said second end of said drill pipe and said second low frequency acoustic attenuator, said surface transceiver configured to transmit data, received from said downhole data transceiver via said drill pipe, to a surface device.

16. The drill string of claim 15, and further comprising:
a third low frequency acoustic attenuator;
said drill pipe further comprising:
a first pipe section having first and second ends; and
a second pipe section having first and second ends;
said first end of said first pipe section coupled to said first low frequency acoustic attenuator and said second end of said first pipe section coupled to said third low frequency acoustic attenuator; and
said first end of said second pipe section coupled to said third low frequency acoustic attenuator and said second end of said second pipe section coupled to said surface transceiver.

17. The drill string of claim 16, and further comprising:
a first acoustic transceiver coupled between said second end of said first pipe section and said third low frequency acoustic attenuator; and
a second acoustic transceiver coupled between said first end of said second pipe section and said third low frequency acoustic attenuator;
said third low frequency acoustic attenuator acoustically isolating said second transceiver from said first transceiver;
said first transceiver non-acoustically coupled to said second acoustic transceiver; said first transceiver non-acoustically transmitting data received thereby to said second transceiver; and
said second transceiver regenerating said data received by said first acoustic transceiver.

18. The drill string of claim 17, wherein said first acoustic transceiver, said third low frequency acoustic attenuator and said second acoustic transceiver collectively operate as an acoustic repeater for said acoustic transmission channel.

19. The drill string of claim 18, wherein said first, second and third low frequency acoustic attenuators are each configured to attenuate acoustical noise in the range of about 400 Hz to about 2 kHz.

20. A drill string for transmitting data, comprising:
a drill pipe capable of acoustically transmitting data;
a downhole data transceiver coupled to said drill pipe, said downhole transceiver configured to accluire downhole information and transmit said acquired downhole information to said drill pipe as data;
a first low frequency acoustic attenuator coupled to said drill pipe;
a first pipe section having first and second ends; and
a second pipe section having first and second ends; wherein
said first low frequency acoustic attenuator is coupled between said second end of said first pipe section and said first end of said second pipe section.

21. The drill string of claim 20, and further comprising:
a first acoustic transceiver coupled between said second end of said first pipe section and said first low frequency acoustic attenuator;
a second acoustic transceiver coupled between said first end of said second pipe section and said first low frequency acoustic attenuator;
said first low frequency acoustic attenuator acoustically isolating said second acoustic transceiver from said first acoustic transceiver;

said first acoustic transceiver non-acoustically coupled to said second acoustic transceiver;

said first acoustic transceiver non-acoustically transmitting data received thereby to said second acoustic transceiver; and said second acoustic transceiver regenerating said data received by said first acoustic transceiver.

22. The drill string of claim 21, wherein said first low frequency acoustic attenuator is configured to attenuate acoustical noise in the range of about 400 Hz to about 2 kHz.

23. A system for acquiring downhole information, comprising:

a drill bit;

a low frequency acoustic attenuator coupled to said drill bit;

a downhole data transceiver coupled to said drill bit such that said low frequency acoustic attenuator is positioned between said downhole transceiver and said drill bit;

a drill pipe coupled to said low frequency acoustic attenuator such that said downhole data transceiver is positioned between said drill pipe and said low frequency acoustic attenuator;

a surface transceiver coupled to said downhole data transceiver such that said drill pipe forms an acoustical transmission channel between said downhole data transceiver and said surface transceiver;

a remote data processing unit; and a communication link coupling said surface transceiver and said remote data processing unit; wherein said downhole data transceiver is configured to transmit acquired information to said acoustical transmission channel of said drill pipe as acoustic signals;

said surface transceiver is configured to receive said data transmitted, by said downhole data transceiver via said acoustic transmission channel and convert said received data into a signal format suitable for transmission to said remote data processing unit via said communication link; and said remote data processing unit configured to process said information acquired by said downhole data transceiver.

24. The system of claim 23, wherein said communication link is a wireless communication link and said signal format is a radio signal.

25. The system of claim 23, wherein said communication link is a wireline communication link and said signal format is an electrical signal.

26. The system of claim 23, wherein:

said remote data processing unit is further configured to issue, over said communication link, control signals in said signal format to said downhole data transceiver;

said surface transceiver is further configured to receive said control signals transmitted, by said remote data processing unit, via said communication link and convert said received control signals into control signals suitable for transmission to said downhole transceiver via said acoustic transmission channel; and said downhole data transceiver is further configured to execute at least one command contained in said received control signals.

27. A system for acquiring downhole information, comprising:

a drill bit;

a downhole data transceiver coupled to said drill bit;

a drill pipe coupled to said drill bit such that said downhole data transceiver is positioned between said drill bit and said drill pipe;

a surface transceiver coupled to said downhole data transceiver such that said drill pipe forms an acoustical transmission channel between said downhole data transceiver and said surface transceiver;

a low frequency acoustic attenuator coupled to said drill pipe such that said surface transceiver is positioned between said drill pipe and said low frequency acoustic attenuator;

a remote data processing unit; and a communication link coupling said surface transceiver and said remote data processing unit; wherein said downhole data transceiver is configured to acquire downhole information and transmit said acquired information to said acoustical transmission channel of said drill pipe as data;

said surface transceiver is configured to receive said data acoustically transmitted, by said downhole data transceiver, via said acoustic transmission channel and convert said received data into a signal format suitable for transmission to said remote data processing unit via said communication link; and said remote data processing unit configured to process said downhole information acquired by said downhole data transceiver.

28. The system of claim 27, wherein said communication link is a wireless communication link and said signal format is a radio signal.

29. The system of claim 27, wherein said communication link is a wireline communication link and said signal format is an electrical signal.

30. The system of claim 29, wherein:

said remote data processing unit is further configured to issue, over said communication link, control signals in said signal format to said downhole data transceiver;

said surface transceiver is further configured to receive said control signals transmitted, by said remote data processing unit, via said communication link and convert said received control signals into control signals suitable for acoustic transmission to said downhole data transceiver via said acoustic transmission channel; and said downhole data transceiver is further configured to execute at least one command contained in said received control signals.

31. A system for acquiring downhole information, comprising:

a drill bit;

a downhole data transceiver coupled to said drill bit;

a first section of drill pipe coupled to said drill bit such that said downhole data transceiver is positioned between said drill bit and said first section of drill pipe;

a low frequency acoustic attenuator coupled to said downhole data transceiver such that said first section of drill pipe is positioned between said downhole data transceiver and said low frequency acoustic attenuator;

a second section of drill pipe coupled to said first section of drill pipe said that said low frequency acoustic attenuator is positioned between said first section of drill pipe and said second section of drill pipe;

a surface transceiver coupled to said low frequency acoustic attenuator such that said second section of drill pipe is positioned between said low frequency acoustic attenuator and said surface transceiver;

a remote data processing unit; and a communication link coupling said surface transceiver and said remote data processing unit.

32. The system of claim 31, and further comprising:
means for transferring data between said first and second sections of drill pipe; wherein
said downhole data transceiver is configured to acquire downhole information and transmit said acquired information to said first section of drill pipe as data;
said first and second sections of drill pipe form an acoustical transmission channel between said downhole data transceiver and said surface transceiver;
said surface transceiver is configured to receive said data transmitted, by said downhole data transceiver, via said acoustic transmission channel and convert said received data into a signal format suitable for transmission to said remote data processing unit via said communication link; and
said remote data processing unit configured to process said downhole information acquired by said downhole data transceiver.

33. The system of claim 32, wherein said means for transferring acoustic data between said first and second sections of drill pipe further comprises:
a first acoustic transceiver coupled to said downhole data transceiver such that said first acoustic transceiver is positioned between said low frequency acoustic attenuator and said first section of drill pipe; and
a second acoustic transceiver coupled to said surface transceiver such that said first acoustic transceiver is positioned between said low frequency acoustic attenuator and said second section of drill pipe.

34. The system of claim 32, wherein
said low frequency acoustic attenuator acoustically isolates said second transceiver from said first transceiver;
said first acoustic transceiver is non-acoustically coupled to said second acoustic transceiver;
said first acoustic transceiver non-acoustically transmitting data received thereby to said second transceiver; and
said second acoustic transceiver regenerating said data received by said first acoustic transceiver.

35. The system of claim 34, wherein said communication link is a wireless communication link and said signal format is a radio signal.

36. The system of claim 35, wherein said communication link is a wireline communication link and said signal format is an electrical signal.

37. The system of claim 35, wherein:
said remote data processing unit is further configured to issue, over said communication link, control signals in said signal format to said surface transceiver;
said surface transceiver is further configured to receive said control signals transmitted, by said remote data processing unit, via said communication link and convert said received control signals into control signals suitable for acoustic transmission to said second acoustic transceiver via said second section of drill pipe;
said second acoustic transceiver is further configured to receive said control signals via said second section of drill pipe and transmit, as electrical signals, said control signals received thereby to said first acoustic transceiver;
said first acoustic transceiver further configured to acoustically regenerate, from said electrical signals received thereby, said control signals received by said second acoustic transceiver; and said downhole data transceiver is further configured to execute at least one command contained in said received control signals.

38. A method for transmitting downhole information, comprising:
transporting data from a downhole data transceiver to a surface transceiver over a drill pipe which couples said downhole transceiver and said surface transceiver and contains an acoustic transmission channel; and
attenuating acoustical noise before said acoustical noise enters said acoustic transmission channel.

39. The method of claim 38, wherein:
said acoustical noise is generated by a drill bit coupled to said downhole transceiver; and
said acoustical noise generated by said drill bit is attenuated before it enters said acoustic transmission channel.

40. The method of claim 38, wherein:
said acoustical noise is generated by surface equipment coupled to said surface transceiver; and
said acoustical noise generated by said surface equipment is attenuated before it enters said acoustic transmission channel.

41. The method of claim 38, and further comprising:
acoustically regenerating said data at least one time during transport, of said data, from said downhole transceiver to said surface transceiver via said acoustic transmission channel.

42. The method of claim 41 wherein:
said acoustical noise is generated by a drill bit coupled to said downhole transceiver; and
said acoustical noise generated by said drill bit is attenuated before it enters said acoustic transmission channel.

43. The method of claim 41, wherein:
said acoustical noise is generated by surface equipment coupled to said surface transmitter; and
said acoustical noise generated by said surface equipment is attenuated before it enters said acoustic transmission channel.

44. The method of claim 41, wherein:
a first source of said acoustical noise is a drill bit coupled to said downhole transceiver;
a second source of said acoustical noise is surface equipment coupled to said surface transceiver; and
said acoustical noise generated by said drill bit and by said surface equipment are attenuated before they enter said acoustic transmission channel.

45. The method of claim 44, wherein said acoustic noise generated by said drill bit is attenuated by a first low frequency acoustic attenuator positioned between said drill bit and said downhole data transceiver.

46. The method of claim 45, wherein said acoustic noise generated by said surface equipment is attenuated by a second low frequency attenuator positioned between said surface equipment and said surface transceiver.

47. A method for transmitting downhole information at an enhanced data rate, comprising:
providing an acoustic transmission channel for transmitting downhole information, said acoustic transmission channel including an acoustic receiver and an acoustic transmitter acoustically isolated from said acoustic receiver; said acoustic transmitter non-acoustically coupled to said acoustic receiver;
transporting data from a downhole data transceiver to a surface transceiver via said acoustic transmission channel;
said acoustic receiver non-acoustically transmitting data received thereby to said acoustic transmitter; and said second acoustic transmitter regenerating said data received by said acoustic receiver;

wherein said acoustic isolation of said acoustic receiver from said acoustic transmitter enables said acoustic transmission channel to operate at enhanced data rates.

48. The method of claim 47, wherein:

said acoustic receiver is a first acoustic transceiver and said acoustic transmitter is a second acoustic transceiver and wherein:

said first acoustic transceiver non-acoustically transmitting data received thereby to said second acoustic transceiver;

said second acoustic transceiver regenerating said data received by said first acoustic transceiver;

said second acoustic transceiver non-acoustically transmitting data received thereby to said first acoustic transceiver; and said first acoustic transceiver regenerating said data received by said second acoustic transceiver.

49. The method of claim 48, wherein:

said acoustic isolation of said second acoustic transceiver from said first acoustic transceiver during regeneration of said data received by said first acoustic transceiver enables uplink data transmissions at enhanced data rates; and said acoustic isolation of said first acoustic transceiver from said second acoustic transceiver during regeneration of said data received by said second acoustic transceiver enables downlink data transmissions at enhanced data rates.

* * * * *